United States Patent [19]

Wu et al.

[11] Patent Number: 4,764,672
[45] Date of Patent: Aug. 16, 1988

[54] STRUCTURE OF HIGH-RESOLUTION POLYGON LASER SCANNER

[76] Inventors: Jing Shown Wu, 10-3, Lane 85, Kee Lung Rd., Sec. 3, Taipei; Ming Her Chu, 2F, 10, Alley 22, Lane 9, Kuang Cheng St., Panchiao, both of Taiwan

[21] Appl. No.: 942,293

[22] Filed: Dec. 16, 1986

[51] Int. Cl.[4] .............................................. H01J 3/14
[52] U.S. Cl. ..................... 250/236; 350/6.8; 358/206
[58] Field of Search .................. 250/235, 236, 234; 350/6.7, 6.8, 486; 358/206, 208, 293, 292

[56] References Cited

U.S. PATENT DOCUMENTS

| | | | |
|---|---|---|---|
| 3,573,849 | 4/1971 | Herriot | 358/206 |
| 4,327,287 | 4/1982 | Saito et al. | 250/234 |
| 4,408,826 | 10/1983 | Ike | 250/236 |
| 4,561,717 | 12/1985 | Kataoka et al. | 350/6.8 |

*Primary Examiner*—Edward P. Westin
*Assistant Examiner*—Khaled Shami
*Attorney, Agent, or Firm*—Holman & Stern

[57] ABSTRACT

An improved high-resolution laser scanner is able to make each mirror facet of a rotating polygon mirror generate two or more scanning beams through the use of beam splitting and projection by a beam splitter so as to increase the scanning speed and enhance the resolution quality. By means of adjustable reflectors, the two or more scanning beams are made to non-simultaneously impinge on the center of the same facet of the polygon mirror, wherefrom the scanning beams are focussed through a lens onto a photo-conductive drum.

1 Claim, 4 Drawing Sheets

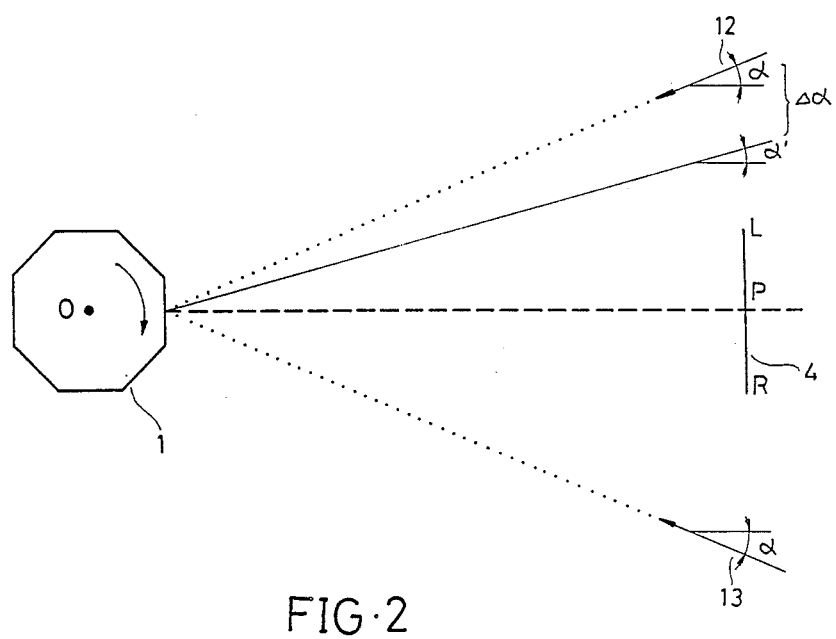
FIG·2

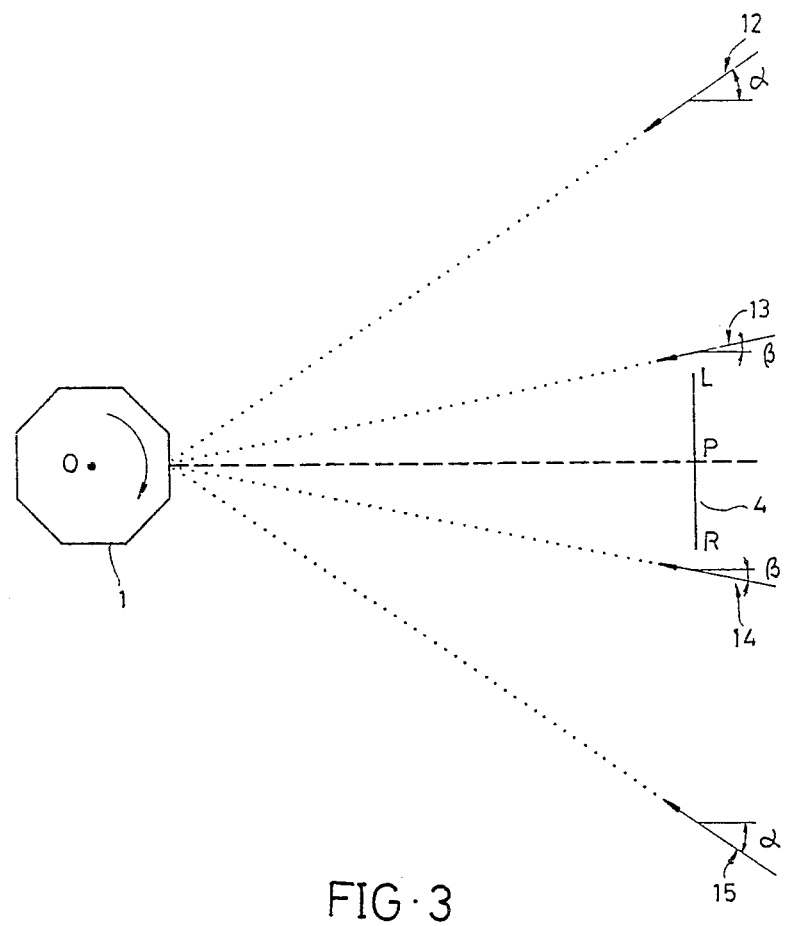
FIG·3

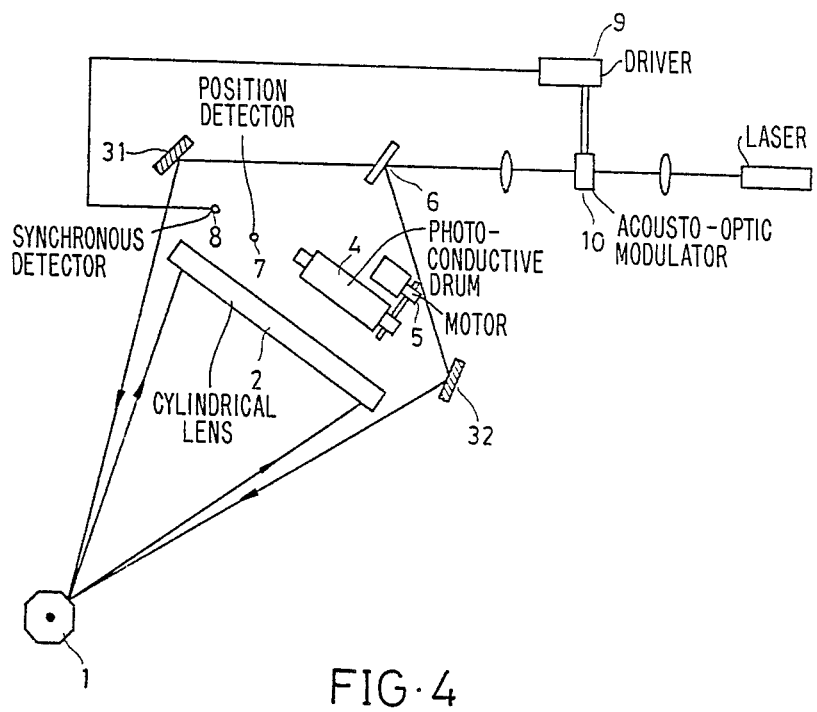
FIG·4

STRUCTURE OF HIGH-RESOLUTION POLYGON LASER SCANNER

BACKGROUND OF THE INVENTION

A laser scanner is a device used for information storage, retrieval, input and output with maximum potential today, and the successful application of laser printers and facsimile apparatus further invites the related technical R&D on the laser scanner by technicians. Among several scanning technologies, the polygon mirror scanner plays a considerably important role in a great number of devices. A series of continuous scanning lines are generated through the rotational reflection of a polygon mirror. Its capability of achieving rapid linear scanning, simple structure and remarkably wide angle of deflection just meet the application requirements for printer and facsimile apparatus. However, in order to improve the scanning resolution and the scanning speed, increasing the rotation velocity of the co-axial driving motor of the polygon mirror may be put into practice but the bearing of said motor will be subject to relative wear and the polygon mirror as a whole tends to wobble. Another approach is to increase the facet number of the polygon mirror, but this will require longer system length and also reduce the scanning angle. Therefore, some innovative ideas have been proposed. According to the literature concerned, there are at least two systems: one of them is to make use of a multi-frequency acousto-optic modulator wherein a composite signal of more than two frequency components is applied to the driver, the emitted light will be diffracted into more than two beams to project onto the polygon mirror to generate a number of scanning lines in juxtaposition simultaneously and the modulating signal may be applied to each scanning line as shown in FIG. 1; another proposal is to make use of a multiple light source device to generate a group of incident light beams in parallel such as the laser diode array or a light emitting diode array. The foregoing two systems all reflect a plurality of incident beams through one mirror facet of the polygon to a photo-conductive drum to generate a multi-beam scanning and each incident beam has to be able to be modulated separately, so their driving circuits are inevitably very complex and their costs are considerably expensive.

In view of the above, this inventor, in order to eliminate the foregoing drawbacks, has developed an improved structure of a high-resolution polygon mirror laser scanner through his research and design for a number of years.

The primary object of this invention is to offer an improved structure of a high-resolution polygon mirror laser scanner which is characterized by simple structure and higher scanning speed so as to achieve the purpose of high-resolution scanning through a few beam splitters which separate the single beam emitted from an acousto-optic modulator into more than two beams, a few mirror reflectors which project each beam onto the mirror facet of a polygon mirror, and a cylindrical lens which focuses and projects these beams onto a photo-conductive drum.

SUMMARY OF THE INVENTION

This invention relates to an improved structure of high-resolution polygon mirror laser scanner which can achieve the practical purpose of high resolution and improve the scanning speed without increasing the rotation velocity of the polygon mirror through the provision of a few beam splitters which separate the laser light emitted from a modulator into more than two beams, a few reflectors which project these beams onto the polygon mirror so that when the polygon mirror rotates, these beams are in a scanning state and projected onto a cylindrical lens to be focused and projected onto a photo-conductive drum.

BRIEF DESCRIPTION OF THE DRAWINGS

FIG. 2 is a layout view of the design of the present invention.

FIG. 3 is another layout view of the design of the present invention.

FIG. 4 is a schematic view of the structure of the present invention.

DETAILED DESCRIPTION OF THE PREFERRED EMBODIMENT

Figure 1:
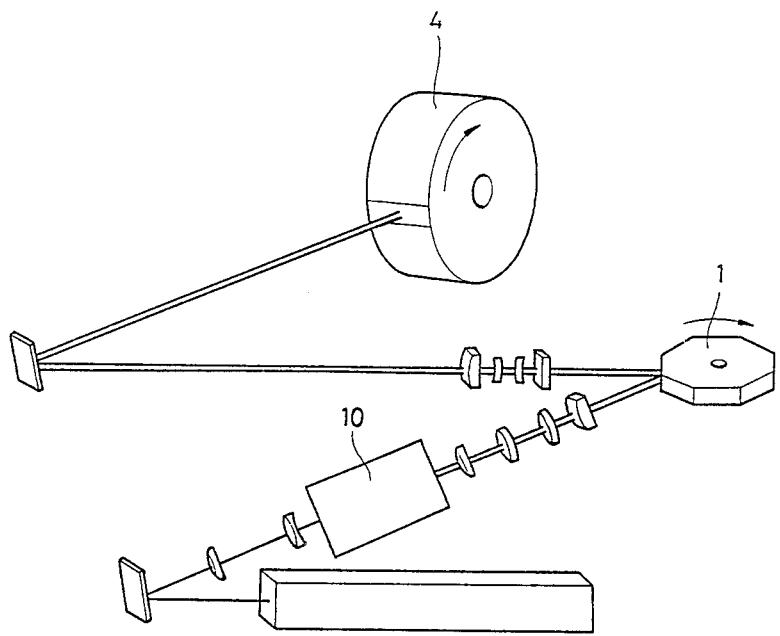
FIG. 1 is a perspective view of a conventional laser scanner structure.

As shown in FIG. 2, a polygon mirror(1) rotates clockwise, a line segment LR represents a photo-conductive drum(4), and a beam A(12) and a beam B(13) were arranged symmetrically with respect to a line segment OP as a mutual axis, so the reflecting light of beam A(12) will first scan and project onto the line segment LR, then reflecting light of Beam B(13) will scan and project onto the line segment LR. These two scanning lines generated therefrom are reflected by the polygon mirror 1 on the same mirror facet, and the time of these two beams A(12) and B(13) scanning onto the line segment LR is not simultaneous. In order to best describe this invention, some concepts are hereby defined as follows:

When the reflecting light of a certain beam scans and projects onto the line segment LR, it is "ON" and the remaining time it is "OFF", so we can change the angle of tilt $\alpha$ of these two symmetrical beams A(12) and B(13) to make a time gap 1 from when beam A(12) is "OFF" to when beam B(13) is "ON" equal to a time gap 2 from when beam B(13) is "OFF" to when next beam A(12) is "ON" (Beam A(12) is reflected by the next mirror facet of the polygon(1) at this time). If so, when the rotation velocity of photo-conductive drum(4) is fixed, the space interval between scanning line groups can be made even to achieve a fine scanning quality. In addition, a selectable parameter is the intercept distance between beam A(12) or B(13) and line segment OP, namely, wherever beam A(12) or B(13) points to. Such a variable will affect the quality of scanning. We know that beams A(12) and B(13) are scanning onto the line segment LR in the direction from L to R, and so far as a certain beam A(12) or B(13) is concerned, it is desirable to fix the distance of movement by the scanning light spot per unit of time as much as possible, and such a magnitude of variation is defined as "tangential distortion". In addition to lengthening the system dimension (i.e. the distance of line segment OP), it may be compensated with an f-$\theta$ lens. Furthermore, on the same specific photo-conductive drum(4) position between beams A(12) and B(13), the magnitude of light spot movement per each unit of time should never lead to too large a difference which is defined as a "discrepancy". If the discrepancy is too large, then when the printer or facsimile set is operated, the graph or character to be displayed by two continued scanning lines will involve a sudden discontinuity which affects the quality of scanning and print-out. As a result of software simulation, the "discrepancy" when the beams pointing to the center of a mirror facet on the polygon mirror(1) is smaller than that when the beams are pointing to the center O of polygon(1), so the center of a mirror facet on the polygon mirror (1) is the position whereto the beams point hereinafter.

According to the design framework of this invention, reflecting a plurality of scanning lines with the same one mirror facet at different times may increase the scanning duty-cyle and scanning speed. When the laser light energy is not the most critical parameter, the framework of this invention has the advantage of simplicity and is capable of increasing the motor life of polygon mirror(1) and decreasing the wobble error during rotation. In addition, this invention can be extended to be a framework as shown in FIG. 3. The software simulation tells us that in case of double beams, the "discrepancy" is smaller than 0.1% of a scanning light spot; and in case of quadruple beams, the "discrepancy" is smaller than 0.25%. So far as the beam horizontal tilt angle of this symmetrical structure is concerned, in the case of double beams, $\alpha = 22.5°$; and in the case of quadruple beams, (beam A(12), beam B(13), beam C(14), beam D(15)) $\alpha = 33.8°$ and $\beta = 11.23°$, and the condition of even intervals between the scanning lines can be met. The said angle $\alpha$ or $\beta$ (horizontal tilt angle) is a condition which has to be met when all the incident beams and the line segment OP are in the same plane. Then the separation distance and interval between the scanning lines can be made even. However, during practical manufacturing, the incident beams in the said plane are not in need of being necessarily symmetrical since the reflectors(31),(32) can be adjusted horizontally and vertically, in other words, if the incident beams cannot meet the condition of angle $\alpha$ (or $\beta$) horizontally, we still can make the separation distance between the scanning lines even through adjusting such a vertical tilt angle. Of course, the magnitude of said vertical tilt angle of incident light is related to the rotation speed of polygon mirror(1) and photo-conductive drum(4). The horizontal tilt angles $\alpha$ and $\beta$ may be regarded as the guide line for initial design and manufacture to achieve the final requirement for quality through the vertical adjustment of reflectors(31),(32).

The design of this invention is hereby further described so that the same may be further appreciated, with reference to the accompanying drawings, as follows:

Beams A(12) and B(13) and axis OP are in the same plane.

When $\alpha = \beta = 22.5°$, gap 1 = gap 2 as mentioned above.

So the gap between beam A(12) scanning from L to R and beam B(13) scanning from L to R is equal to the gap between beam B(13) scanning L to R and next beam A(12) scanning from L to R.

Since the rotation velocity of photo-conductive drum(4) is fixed, so the interval and distance between the scanning lines will be even.

If $\alpha$ (or $\beta$) is not 22.5°, gap 1≠gap 2,
gap 1=beam A(12) OFF~beam B(13) ON,
gap 2=beam B(13) OFF~next beam A(12) ON.

If $\alpha = \alpha'(21° < 22.5°)$, gap 1 < gap 2, and the interval and distance between the scanning lines are uneven, we have to adjust the reflector(31) in the vertical direction so that the scanning lines reflected by beam A(12) can project onto a position higher than normal for neutralization and compensation.

If $\alpha' < 22.5°$ then this also causes uneveness.

If $\alpha' = 22.5° - \Delta\alpha$ (Assume $\Delta\alpha > 0$ as shown in the preceding instance), the unit of $\Delta\alpha$ is deg, $$\text{gap 2} = \text{gap 1} + \frac{\Delta\alpha}{W\,polygon} \times V\,drum,$$

so the magnitude of upward deflection the scanning lines of beam A(12) is $$\frac{\text{gap 2} - \text{gap 1}}{2} = \frac{\Delta\alpha}{2} \times \frac{V\,drum}{W\,polygon}.$$

W polygon: polygon angular velocity/unit: deg/sec.
V drum: photo-conductive drum rotation velocity/unit: cm/sec.

Assume the effective length from the reflector(31) to the polygon(1) and further to the photo-conductive drum(4) (in combination of the focusing effect of the lens) is l (unit: cm), beam A(12) has to be in the vertical direction to incline upward $$\frac{\Delta\alpha}{2} \times \frac{V\,drum}{W\,polygon} \times \frac{1}{l}.$$

The preceding formula indicates a magnitude in radians, expressed in degrees which is $$\frac{\Delta\alpha}{2} \times \frac{V}{W} \times \frac{1}{l} \times \frac{180}{\pi}\,\text{deg.}$$

According to the law of reflection, the reflector(32) has only to be in the vertical direction to incline upward $$\frac{\Delta\alpha}{4} \times \frac{V}{Wl} \times \frac{180'}{\pi} = \frac{\Delta\alpha \cdot V45}{Wl\pi}\,\text{deg.}$$

However, if this angle is adjusted too large, it will:
(1) Affect the position (vertical direction) on the cylindrical lens(2) to be penetrated by the laser light to affect the resolution of the scanning lines; and
(2) Affect the distribution of "tangential distortion" and "discrepancy" between beam A(12) and beam B(13).

The tolerable range of $\Delta\alpha$ is the composite function of V, W and l (as shown in the foregoing formula derived therefrom) and is related to the off-axis focusing characteristics of cylindrical lens(2) and the tolerance of tangential distortion and discrepancy and is dependent on the specifications of the system → generally $|\Delta\alpha| < 8°$.

The foregoing concept may be extended to quadruple beams or a plurality of beams including the case of an odd number of beams.

As shown in FIG. 4, this invention is composed of a beam splitter(6) to separate the beams emitted from an acousto-optic modulator(10) into two beams, two reflectors(31),(32) capable of being adjusted horizontally and vertically to project the beams onto the mirror facet of a polygon mirror(1) which reflects these beams onto a photo-conductive drum(4) through the focusing of a cylindrical lens(2) for system synchronization through a synchronous detector(8) (i.e. a photoelectric diode), wherein the said beams point to the center of said mirror facet and the tilt angle of these beams can be adjusted with these reflectors(31),(32). This invention is designed to generate a trigger signal to notify the driver(9), which the modulating signal feeds, when it should start to act, and to set up a position sensing device(7) (i.e. position sensitive detector) vertically so as to detect the position of scanning lines in the vertical direction and to make gap 1=gap 2. Therefore, this invention, at different time frames, enables each mirror facet of the polygon mirror(1) to generate more than two scanning lines so that under the premise of not varying the rotation velocity of polygon mirror(1), the scanning speed is doubled to further enhance resolution.

What is claimed is:

1. A high-resolution laser scanner comprising a laser beam source, an acousto-optic modulator, at least one beam splitter for separating a modulated light beam transmitted from said acousto-optic modulator into at least two separated light beams, a rotating multi-faceted polygon mirror, at least one vertically and horizontally adjustable reflector for non-simultaneously reflecting each of said separated light beams onto the center of the same mirror facet of said polygon mirror wherefrom said separated light beams are scanned by the said mirror facet of said polygon mirror onto a cylindrical lens which focuses said scanning light beams on a rotating photo-conductive drum, said polygon mirror rotating at a fixed speed, said scanner further comprising a vertical position sensitive photo-detector for detecting vertical positions of said separate scanning light beams, the tilt angle of said adjustable reflectors being adjusted in accordance with detection of said scanning light beams for maintaining a predetermined gap interval between said separate scanning light beams.

* * * * *